(12) United States Patent
Peel (10) Patent No.: US 9,273,450 B2
(45) Date of Patent: Mar. 1, 2016

(54) PLUMBING FIXTURE WITH HEATING ELEMENTS

(71) Applicant: KOHLER MIRA LIMITED, Cheltenham, Gloucestershire (GB)

(72) Inventor: Kevin T. Peel, Gloucester (GB)

(73) Assignee: KOHLER MIRA LIMITED (GB)

( * ) Notice: Subject to any disclaimer, the term of this patent is extended or adjusted under 35 U.S.C. 154(b) by 0 days.

(21) Appl. No.: 13/796,337

(22) Filed: Mar. 12, 2013

(65) Prior Publication Data

US 2013/0340846 A1     Dec. 26, 2013

(30) Foreign Application Priority Data

Jun. 22, 2012 (GB) .................................. 1211098.7
Jun. 22, 2012 (GB) .................................. 1211101.9

(51) Int. Cl.
    *E03C 1/04*      (2006.01)
    *F16K 11/24*      (2006.01)
    (Continued)

(52) U.S. Cl.
    CPC ................ *E03C 1/0404* (2013.01); *B05D 1/24* (2013.01); *E03B 7/006* (2013.01); *E03B 7/074* (2013.01);
    (Continued)

(58) Field of Classification Search
CPC ......... E03C 1/0404; E03C 1/04; E03C 1/055; E03C 1/02; F16K 11/24; F16K 31/04; F16K 49/002; F16K 19/00; G05D 23/1396; G05D 23/1858; G05D 23/19; G05D 11/13; G05D 7/0617; G05D 23/1917; E03B 7/075; E03B 7/006; E03B 7/074; E03B 7/078; B05B 1/24; Y10T 137/87684; Y10T 137/87668; Y10T 137/8376; Y10T 137/86389; Y10T 137/0424; Y10T 137/0391; Y10T 137/0318; Y10T 137/7759; Y10T 137/0329; Y10T 137/6606; Y10T 137/8593; Y10T 137/87692
USPC ............ 137/341, 801, 625.4, 625.41, 625.17, 137/602, 603, 606, 605; 4/596–598, 623, 4/607; 251/129.04; 422/28, 38, 108–110, 422/307
See application file for complete search history.

(56) References Cited

U.S. PATENT DOCUMENTS 1,065,615 A      6/1913    Lawler
1,479,546 A *    1/1924    Johnson .................... 137/625.13
(Continued)

FOREIGN PATENT DOCUMENTS

CN      2255233      6/1997
CN      2531183 Y    1/2003
(Continued)

OTHER PUBLICATIONS

International Search Report and Written Opinion for Application No. PCT/IB2013/001646, mail date Sep. 19, 2013, 12 pages.
(Continued)

*Primary Examiner* — Craig Schneider
*Assistant Examiner* — David Colon Morales
(74) *Attorney, Agent, or Firm* — Foley & Lardner LLP (57) ABSTRACT

A plumbing component includes a valve provided within a portion of the plumbing component and configured to control the flow of water through the plumbing component. The valve includes a body and at least one waterway within the body. An electric heater extends through at least a portion of the body of the valve and is configured to heat at least a portion of the body to an elevated temperature sufficient to kill organisms within the waterway.

32 Claims, 8 Drawing Sheets

(51) Int. Cl.

| | | |
|---|---|---|
| F17D 1/00 | (2006.01) | |
| E03B 7/07 | (2006.01) | |
| E03B 7/00 | (2006.01) | |
| F16K 49/00 | (2006.01) | |
| G05D 7/06 | (2006.01) | |
| G05D 23/19 | (2006.01) | |
| F16K 11/00 | (2006.01) | |
| E03C 1/02 | (2006.01) | |
| F16K 31/04 | (2006.01) | |
| G05D 11/13 | (2006.01) | |
| B05D 1/24 | (2006.01) | |
| G05D 11/16 | (2006.01) | |
| G05D 23/185 | (2006.01) | |
| G05D 23/13 | (2006.01) | |
| F16K 1/44 | (2006.01) | |
| F16K 11/22 | (2006.01) | |

(52) U.S. Cl.
CPC ............... *E03B 7/075* (2013.01); *E03B 7/078* (2013.01); *E03C 1/02* (2013.01); *E03C 1/04* (2013.01); *F16K 1/44* (2013.01); *F16K 11/22* (2013.01); *F16K 11/24* (2013.01); *F16K 19/00* (2013.01); *F16K 31/04* (2013.01); *F16K 49/002* (2013.01); *F17D 1/00* (2013.01); *G05D 7/0617* (2013.01); *G05D 11/13* (2013.01); *G05D 11/16* (2013.01); *G05D 23/1393* (2013.01); *G05D 23/1858* (2013.01); *G05D 23/19* (2013.01); *G05D 23/1917* (2013.01); *Y10T 137/0318* (2015.04); *Y10T 137/0329* (2015.04); *Y10T 137/0391* (2015.04); *Y10T 137/0424* (2015.04); *Y10T 137/6606* (2015.04); *Y10T 137/7759* (2015.04); *Y10T 137/8376* (2015.04); *Y10T 137/8593* (2015.04); *Y10T 137/86389* (2015.04); *Y10T 137/87668* (2015.04); *Y10T 137/87684* (2015.04); *Y10T 137/87692* (2015.04)

(56) References Cited

U.S. PATENT DOCUMENTS

| | | | |
|---|---|---|---|
| 1,500,820 A | | 7/1924 | Jones |
| 1,923,711 A | | 8/1933 | Decker |
| 2,044,634 A | * | 6/1936 | Rieder .................. 392/473 |
| 2,449,766 A | | 9/1948 | Brown |
| 2,452,367 A | * | 10/1948 | Gangloff .................. 219/201 |
| 3,012,583 A | | 12/1961 | Gorgens et al. |
| 3,087,675 A | | 4/1963 | Honegger |
| 3,116,748 A | | 1/1964 | Wasson |
| 3,150,687 A | | 9/1964 | Torsten Kalle |
| 3,561,481 A | | 2/1971 | Taplin |
| 3,561,482 A | | 2/1971 | Taplin |
| 3,584,784 A | | 6/1971 | Burhop |
| 3,587,156 A | | 6/1971 | Sorenson |
| 3,633,617 A | | 1/1972 | Stacey et al. |
| 3,696,836 A | | 10/1972 | Bauer |
| 3,706,872 A | | 12/1972 | Trabilcy |
| 3,762,443 A | | 10/1973 | Sorenson |
| 3,896,836 A | | 7/1975 | Labarre |
| 3,915,193 A | | 10/1975 | Rutt |
| 3,990,477 A | | 11/1976 | Johnson |
| 4,177,970 A | | 12/1979 | Ring |
| 4,253,482 A | | 3/1981 | Stephens |
| 4,324,267 A | | 4/1982 | Bach |
| 4,422,470 A | | 12/1983 | Jackson |
| 4,448,211 A | | 5/1984 | Yoshida |
| 4,696,428 A | * | 9/1987 | Shakalis .................. 236/12.12 |
| 4,738,393 A | | 4/1988 | Bergmann et al. |
| 4,739,798 A | | 4/1988 | Botnick |
| 4,785,845 A | * | 11/1988 | Kochal .................. 137/341 |
| 4,873,830 A | * | 10/1989 | Blattler .................. 62/3.3 |
| 4,895,126 A | | 1/1990 | Nishimiya et al. |
| 4,928,494 A | | 5/1990 | Glamm |
| 4,955,535 A | | 9/1990 | Tsutsui et al. |
| 4,967,794 A | | 11/1990 | Tsutsui et al. |
| 4,971,106 A | | 11/1990 | Tsutsui et al. |
| 4,986,085 A | | 1/1991 | Tischer |
| 5,011,112 A | | 4/1991 | Glamm |
| 5,033,671 A | | 7/1991 | Shiba |
| 5,050,062 A | | 9/1991 | Hass |
| 5,083,745 A | | 1/1992 | Tischer |
| 5,085,399 A | | 2/1992 | Tsutsui et al. |
| 5,199,790 A | | 4/1993 | Pawelzik et al. |
| 5,206,963 A | * | 5/1993 | Wiens .................. 4/603 |
| 5,417,083 A | | 5/1995 | Eber |
| 5,647,531 A | | 7/1997 | Kline et al. |
| 5,870,302 A | * | 2/1999 | Oliver .................. 700/11 |
| 5,979,775 A | * | 11/1999 | Raya .................. 236/12.12 |
| 5,993,117 A | | 11/1999 | Lancaster |
| 6,070,615 A | | 6/2000 | Chen |
| 6,145,538 A | | 11/2000 | Park |
| 6,157,103 A | | 12/2000 | Ohta |
| 6,286,550 B1 | | 9/2001 | Yamaki et al. |
| 6,668,854 B2 | | 12/2003 | Fukuda |
| 6,688,332 B2 | | 2/2004 | Liesenhoff |
| 6,708,721 B2 | | 3/2004 | Fukuda |
| 6,748,969 B2 | | 6/2004 | Kanzaka |
| 6,805,152 B2 | | 10/2004 | Kanzaka |
| 6,854,658 B1 | | 2/2005 | Houghton et al. |
| 6,860,288 B2 | * | 3/2005 | Uhler .................. 137/552 |
| 6,895,995 B2 | | 5/2005 | Kirkman |
| 6,898,467 B1 | * | 5/2005 | Smith et al. .................. 700/20 |
| 6,932,112 B2 | | 8/2005 | Bradford |
| 7,000,854 B2 | | 2/2006 | Malek |
| 7,010,396 B2 | | 3/2006 | Ware |
| 7,017,884 B2 | | 3/2006 | Brinks |
| 7,147,203 B2 | * | 12/2006 | Terrell .................. 251/121 |
| 7,177,725 B2 | * | 2/2007 | Nortier et al. .................. 700/282 |
| 7,286,904 B2 | * | 10/2007 | Graham .................. 700/284 |
| 7,303,151 B2 | | 12/2007 | Wu |
| 7,367,352 B2 | | 5/2008 | Hagen |
| 7,372,002 B2 | | 5/2008 | Nakamura |
| 7,403,839 B1 | * | 7/2008 | Kaplan .................. 700/282 |
| 7,445,024 B2 | | 11/2008 | Paterson et al. |
| 7,665,483 B1 | | 2/2010 | Sid |
| 7,726,333 B2 | | 6/2010 | Hoshi |
| 7,814,929 B2 | | 10/2010 | Yewdall et al. |
| 7,857,234 B2 | * | 12/2010 | Daley et al. .................. 236/12.12 |
| 7,889,187 B2 | * | 2/2011 | Freier et al. .................. 345/184 |
| 8,162,236 B2 | | 4/2012 | Rodenbeck et al. |
| 8,950,426 B2 | | 2/2015 | Yewdall et al. |
| 2002/0019709 A1 | * | 2/2002 | Segal .................. 702/45 |
| 2003/0080194 A1 | * | 5/2003 | O'Hara et al. .................. 236/12.12 |
| 2003/0168111 A1 | | 9/2003 | Koga |
| 2006/0144443 A1 | | 7/2006 | Yewdall et al. |
| 2006/0161270 A1 | * | 7/2006 | Luskin et al. .................. 700/22 |
| 2006/0231638 A1 | | 10/2006 | Belz |
| 2007/0119501 A1 | | 5/2007 | Pinette |
| 2007/0246550 A1 | * | 10/2007 | Rodenbeck et al. ........ 236/12.11 |
| 2008/0099088 A1 | * | 5/2008 | Boey .................. 137/624.11 |
| 2008/0112843 A1 | * | 5/2008 | Peel et al. .................. 422/2 |
| 2008/0167931 A1 | | 7/2008 | Gerstemeier |
| 2008/0196156 A1 | * | 8/2008 | Brewin .................. 4/597 |
| 2008/0302991 A1 | | 12/2008 | Tseng |
| 2009/0261282 A1 | * | 10/2009 | Connors .................. 251/129.01 |
| 2010/0155505 A1 | | 6/2010 | Lopp et al. |
| 2010/0161144 A1 | * | 6/2010 | Crist .................. 700/284 |
| 2011/0088799 A1 | | 4/2011 | Jung |
| 2011/0094481 A1 | | 4/2011 | Zui et al. |
| 2011/0108135 A1 | | 5/2011 | Zhong |
| 2011/0192476 A1 | | 8/2011 | Underwood |
| 2012/0012768 A1 | | 1/2012 | Yahr |
| 2013/0062422 A1 | | 3/2013 | Marty |
| 2013/0075483 A1 | | 3/2013 | Marty |

FOREIGN PATENT DOCUMENTS

| | | |
|---|---|---|
| CN | 101000111 A | 7/2007 |
| CN | 201227179 Y | 4/2009 |
| CN | 201235319 Y | 5/2009 |

(56) References Cited

FOREIGN PATENT DOCUMENTS

| | | |
|---|---|---|
| CN | 201526709 | 7/2010 |
| CN | 201896985 U | 7/2011 |
| CN | 202118366 U | 1/2012 |
| CN | 202252130 U | 5/2012 |
| CN | 202901383 | 4/2013 |
| DE | 195 16 887 | 11/1996 |
| DE | 100 33 351 | 2/2002 |
| DE | 10 2006 08 524 | 8/2006 |
| DE | 102006024069 | 11/2007 |
| DE | 2020090 07 243 | 10/2009 |
| DE | 202011000038 | 6/2012 |
| DE | 102012100097 | 7/2012 |
| EP | 1 583 920 | 10/2005 |
| EP | 2169124 A2 | 3/2010 |
| FR | 2916033 | 11/2008 |
| GB | 0 937 091 | 9/1963 |
| GB | 937091 | 9/1963 |
| GB | 1123256 | 8/1968 |
| GB | 2081841 | 2/1982 |
| GB | 2 143 304 | 2/1985 |
| GB | 2143304 | 2/1985 |
| JP | H08270834 A | 10/1996 |
| NL | 1035474 | 2/2010 |
| NL | 1035475 | 2/2012 |
| WO | WO 2007/096771 | 8/2007 |
| WO | WO2010/021891 | 2/2010 |
| WO | WO 2010060142 A1 * | 6/2010 ............. E03C 1/044 |

OTHER PUBLICATIONS

International Search Report and Written Opinion for Application No. PCT/IB2013/001647, mail date Oct. 25, 2013, 11 pages.

Combined Search Report and Examination Report mailed Aug. 21, 2012.

* cited by examiner

PLUMBING FIXTURE WITH HEATING ELEMENTS

CROSS-REFERENCE TO RELATED PATENT APPLICATIONS

The present application claims the benefit of and priority to United Kingdom Patent Application No. 1211098.7, filed Jun. 22, 2012, and United Kingdom Patent Application No. 1211101.9, filed Jun. 22, 2012, the entire disclosures of which are incorporated herein by reference.

BACKGROUND

The present application relates to plumbing fittings and fixtures and water supply systems and installations for washing, showering, bathing and the like that employ such plumbing fittings and fixtures. The concepts disclosed herein have particular, but not exclusive, application to mixer valves (alternatively referred to as "mixing valves"), especially thermostatic mixer valves. More particularly, the present application relates to an arrangement for thermally disinfecting mixer valves.

Mixer valves that dispense blended fluids such as water (e.g., hot and cold supplies, mixing to a typical washing/showering temperature of around 40° C.) may be prone to harboring micro-organisms. Such micro-organisms can enter the valves either through the supply water or through splash back into the spout outlet. This problem is particularly problematic since micro-organisms are particularly prone to proliferation within a temperature range of 35 to 45° C. The presence of micro-organisms in waterways used for washing/showering can give rise to health risks where such micro-organisms may be contained in water discharged from the mixer valve. For example, when washing/showering, micro-organisms present in the water may enter the body through cuts and abrasions in the skin or may be inhaled.

These problems can be exacerbated by other factors, including the use in valve components of certain polymers or elastomers that provide a suitable habitat for sustaining micro-organisms in a living state and/or that encourage micro-organism growth and development, the existence of stagnant areas within the valve where water can be trapped in low circulation areas, high volumes of residual water contained within the valve once shut off, and large wetted areas within the valve, among others.

It is known to employ a thermal disinfection routine in which hot water is used to kill/remove micro-organisms in waterways used for washing/showering. Such disinfection routines involve flushing the waterways with water at an elevated temperature, typically at least 60° C., for a time sufficient to kill or remove micro-organisms from the valve.

The use of such hot water disinfecting/cleaning routines in waterways used for washing/showering can give rise to other issues, however. For example, in the event that a user comes into contact with the hot water being discharged, the user may suffer scalding of the exposed skin or physical discomfort from the high temperature water. Another issue relates to the cost and other difficulties associated with providing and maintaining high (above 60° C.) hot water temperatures for a sustained period of time sufficient to perform the cleaning routine. Such hot water may also undesirably generate excessive amounts of steam in the surrounding area, and the water flow/water noise may disturb room occupants (e.g., in hospital wards or other areas where people may be present in the vicinity of the waterways). Yet another issue relates to the fact that only areas of the waterway that are in contact with the hot water supply may be sufficiently cleaned or disinfected, with a result that other areas of the waterway that are only in contact with cold water may not be cleaned adequately.

It would be advantageous to provide an improved valve and/or cleaning method to address one or more of the aforementioned challenges.

SUMMARY

An exemplary embodiment relates to a plumbing component that includes a valve provided within a portion of the plumbing component and configured to control the flow of water through the plumbing component. The valve includes a body and at least one waterway within the body. An electric heater extends through at least a portion of the body of the valve and is configured to heat at least a portion of the body to an elevated temperature sufficient to kill organisms within the waterway.

Another exemplary embodiment relates to a water delivery component configured to be engaged by a user for providing water as directed by the user. The water delivery component includes a mixer valve provided within a portion of the water delivery component, the mixer valve comprising a first inlet for receiving cold water and a second inlet for receiving hot water. The mixer valve is configured to mix the hot water and cold water in a mixing chamber provided within the mixer valve. A heating element extends through at least a portion of the mixer valve and configured to heat at least a portion of the mixer valve to an elevated temperature sufficient to kill organisms that may be within the mixer valve.

Another exemplary embodiment relates to a plumbing fixture that includes a mixing valve including a body, a first inlet configured to be coupled to a first fluid source and a second inlet configured to be coupled to a second fluid source, and an outlet for directing a mixture of the first and second fluids out of the mixing valve. An electric heating element is provided within the plumbing fixture for heating the body of the mixing valve to an elevated temperature sufficient to kill organisms within the mixing valve.

BRIEF DESCRIPTION OF THE DRAWINGS

Other features, benefits and advantages of the invention will be more readily understood from the following description of an exemplary embodiment with reference to the accompanying drawings, in which.

DETAILED DESCRIPTION

According to an exemplary embodiment, a plumbing fitting, valve (e.g., a flow control valve, a mixer valve, etc.), and/or a plumbing fixture associated with the plumbing fitting and/or valve include an electrical heating device for heating thermally-conductive water contact parts thereof. Each of these items include internal passages (e.g., waterways) that include walls or surfaces that may harbor bacteria or other micro-organisms. According to an exemplary embodiment, the heating elements described herein may be operable to heat the thermally-conductive portions of such components to an elevated temperature sufficient to kill or otherwise dispose of such undesired organisms.

According to one embodiment, a flow control valve (i.e., a valve that receives only a single source of fluid, such as a valve for use in an instantaneous hot water spout) includes an electrical heating device provided adjacent or in contact with the flow control valve to heat all or a portion of the flow control valve. It should be noted that although the present description references various components as being part of water delivery systems and components, it should be understood that the concepts discussed herein may have utility in other types of fluid delivery systems for fluids other than water.

According to another exemplary embodiment, a mixer valve (alternatively referred to as a mixing valve, and referring to a valve that receives multiple sources of fluid and provides a chamber for mixing the sources of fluid together) includes an electrical heating device provided adjacent or in contact with the valve to heat all or a portion of the valve.

According to yet another exemplary embodiment, a plumbing fitting or a plumbing fixture (e.g., a faucet, shower head, tub spout, or any other type of water delivery source or component) includes an electrical heating device provided adjacent or in contact with the plumbing fixture to heat all or a portion of the plumbing fixture. It should be understood that the plumbing fitting or fixture may include an associated valve (e.g., a flow control valve, a mixer valve, etc.) that may include its own associated electrical heating device, may share the electrical heating device with the one used for the plumbing fitting or fixture, or may not include an associated electrical heating device (e.g., the heat applied to the plumbing fitting or fixture may be sufficient to heat the valve by conduction or convection, as in the case where both the valve and a portion of the plumbing fitting or fixture are made from a thermally-conductive material such as a metal and the valve and the portion of the plumbing fixture are in contact with each other).

According to one exemplary embodiment, a combination of thermally-conductive water contact parts of a valve, plumbing fitting, and/or plumbing fixture in conjunction with electrical heating is used so that a controlled thermal disinfection can be carried out by heating the thermally-conductive water contact parts to a temperature sufficient to kill micro-organisms. Such thermal disinfection cycle may be carried out at a predetermined temperature for a predetermined amount of time sufficient to kill or otherwise dispose of micro-organisms that may be present.

The water contact parts (i.e., those parts that come into contact with water) may be made of thermally-conductive materials such as metals or alloys. According to an exemplary embodiment, the water contact parts may be formed either entirely or in part of a material that includes copper, such as copper, copper alloys (e.g., brass, bronze, etc.), and other alloys or materials that include copper. One advantageous feature of using copper-containing materials is that such materials are known to have good antimicrobial properties.

According to an exemplary embodiment, the valve, plumbing fixture, and/or the plumbing fitting may have waterways formed in a body of thermally-conductive material (e.g., a metal or metal-containing material, etc.). Alternatively or additionally, the waterways may be lined with thermally-conductive material.

The electrical heating may be provided by an electrical resistive heating element. Such a heating element may be of the relatively low power variety, such as, for example up to 50 watts. According to another exemplary embodiment, the heating element may have a power of up to 25 watts. According to yet another exemplary embodiment, the heating element may have a power of up to 10 watts. It may be that power consumption can be minimized by reducing the thermal mass of the part(s) to be heated and/or by insulating the part(s) to be heated from other parts of the valve, fitting, or plumbing fixture in which the valve or fitting may be employed. According to other exemplary embodiments, heating elements other than electrical resistive heating elements that may be now known or developed in the future may be employed in the context of the concepts described herein, and such other types of heating elements are intended to be within the scope of the present disclosure.

According to an exemplary embodiment, the plumbing fitting may be configured to mix supplies of hot and cold water and provide a source of blended water having a desired temperature for washing/showering. For example, the plumbing fitting may be a mixer valve.

According to yet another exemplary embodiment, a method of disinfecting a waterway in a valve, plumbing fitting, or plumbing fixture includes providing waterways in thermally-conductive parts of the valve, plumbing fitting, or plumbing fixture and providing an electrical heating device to heat the thermally-conductive parts. Such method may further include raising the temperature of the heating device to a predetermined temperature for a period of time sufficient to kill or otherwise dispose of micro-organisms that may be present.

Figure 1:
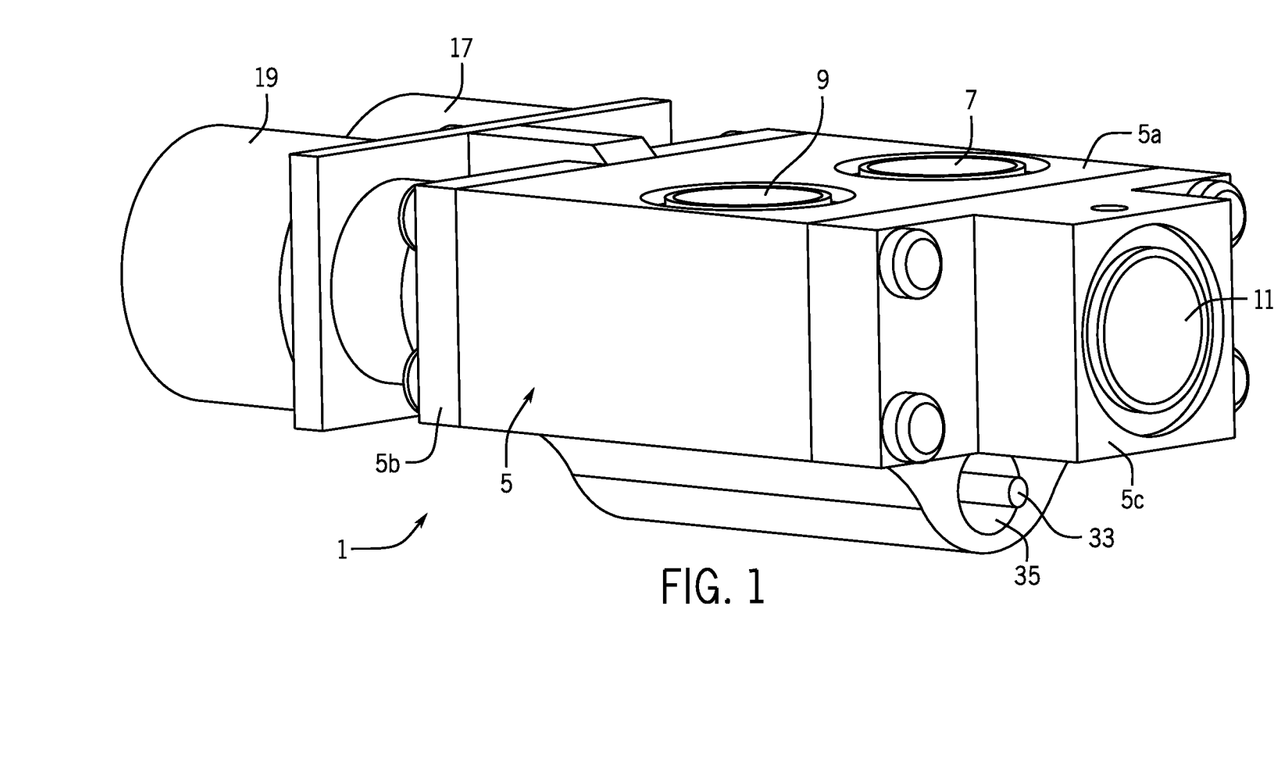
FIG. 1 is a perspective view of a mixer valve according to an exemplary embodiment.
Figure 2:
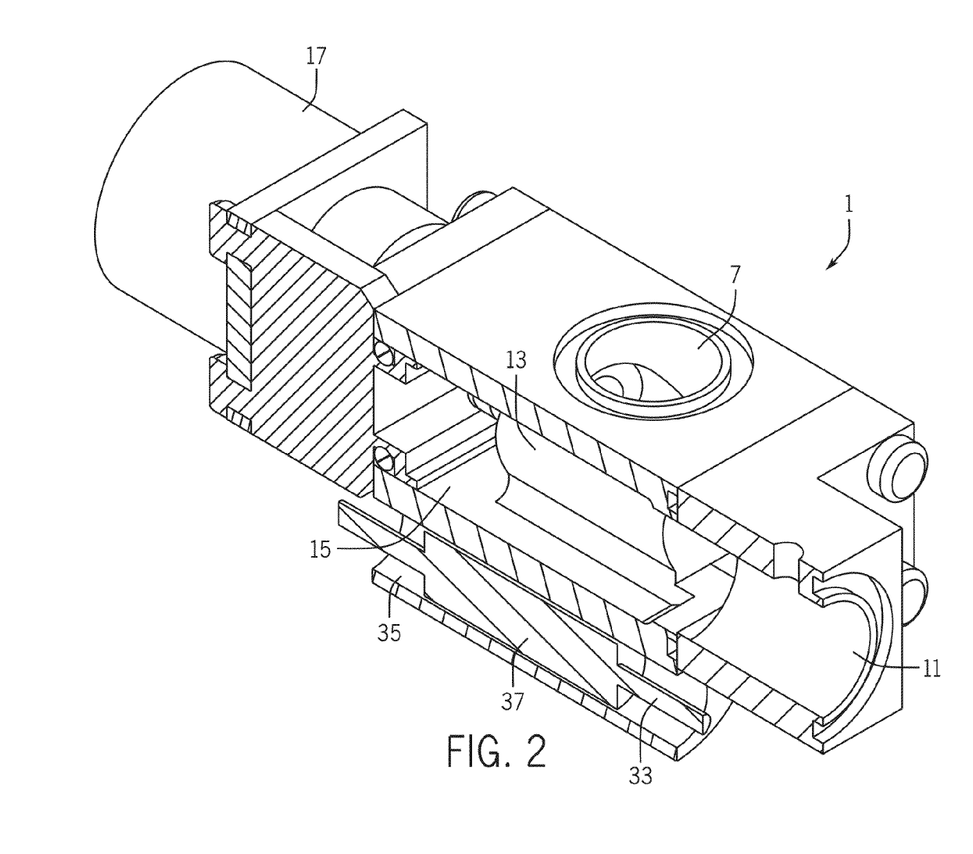
FIG. 2 is a sectional view of the mixer valve shown in FIG. 1.
Figure 3:
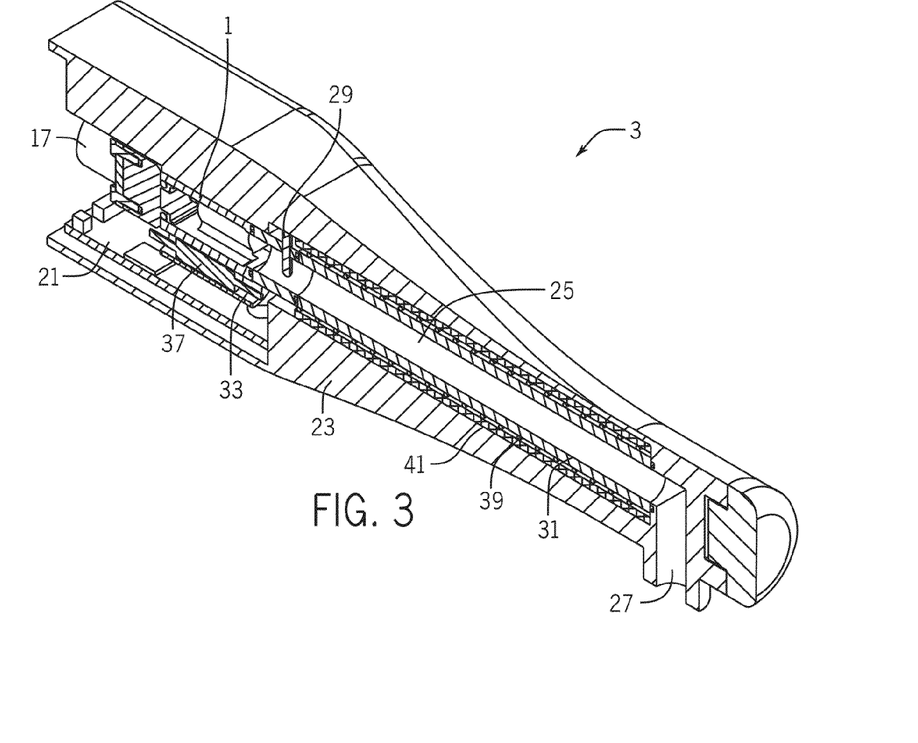
FIG. 3 is a sectional view of a plumbing fixture incorporating the mixer valve shown in FIGS. 1 and 2 according to an exemplary embodiment.

Referring now to the accompanying drawings, FIGS. 1 and 2 show a mixer valve 1 and FIG. 3 shows a plumbing fixture 3 employing the mixer valve 1. In this embodiment, the plumbing fixture 3 is a faucet for delivery of water to a washbasin or sink (not shown), although it should be understood by those reviewing the present application that such a configuration is not intended as limiting and, for example, the mixer valve 1 may be employed in other plumbing fixtures such as shower heads, bath spouts, or other water delivery components.

The mixer valve 1 includes a body 5 having inlets 7, 9 for connection to supplies of hot and cold water and an outlet 11 for temperature controlled water. The body 5 includes a center section 5*a* and end sections 5*b*, 5*c* at opposite ends of the center section 5*a*.

The inlets 7, 9 are provided in the center section 5*a* and the outlet 11 is provided in the end section 5*c*. The sections 5*a*, 5*b*, 5*c* are made of a thermally-conductive material such as a metal or alloy, and, according to an exemplary embodiment, of a copper or copper alloy material such as brass. The sections 5a, 5b, 5c are secured together in a fluid tight manner according to an exemplary embodiment.

Housed within the center section 5a are two flow control valves 13 (of which only one is shown FIGS. 2 and 3). Each flow control valve 13 communicates with a respective inlet 7, 9 and is operable to provide a flow of water to a mixing chamber 15 within the center section 5a that communicates with the outlet 11 in the end section 5c.

Each flow control valve 13 is operable to adjust the flow of water admitted to the mixing chamber 15 from zero flow (valve closed) to maximum flow (valve fully open). In this embodiment, each flow control valve 13 is controlled by a motor 17, 19 such as a stepper motor mounted on the end section 5c of the valve body 5. The motors 17, 19 are operable to move each fluid control valve in a linear fashion so as to open or close the valve.

The flow of each of the hot and cold water admitted to the mixing chamber 15 may be infinitely variable throughout the range from zero flow to maximum flow to provide a desired outlet water temperature and flow rate.

The motors 17, 19 may be controlled by an electronic controller such as a microprocessor which may be provided by a control panel 21 such as a printed circuit board (see FIG. 3) incorporated into the plumbing fixture 3. In this embodiment, the plumbing fixture 3 has a body 23 with a recessed area in the base in which the mixer valve 1 and control panel 21 are received and the outlet 11 from the mixer valve 1 opens to an internal passageway 25 that extends within the body 23 to an outlet 27.

The controller may receive an input of desired outlet water temperature from a user interface (not shown) on or in the vicinity of the plumbing fixture 3 and an input of the actual outlet water temperature from a sensor 29 arranged in the outlet 11 of the mixer valve 1 to monitor the outlet water temperature flowing through the passageway 25 to the outlet 27 of the plumbing fixture 3. The motors 17, 19 may be controlled by the controller in response to the inputs to adjust the flow control valves 13 to achieve and maintain the desired outlet water temperature.

The controller may also receive an input of desired outlet water flow rate from the user interface and an input of the actual outlet water flow rate from a sensor (not shown) arranged to monitor the outlet water flow rate in the passageway 25. The motors 17, 19 may be controlled by the controller in response to the inputs to adjust the flow control valves 13 to achieve and maintain the desired outlet water flow rate.

By employing separate motors 17, 19 to control the flow control valves 13, the outlet water temperature and/or flow rate may be adjusted independently or in combination by appropriate control of each flow control valve 13 to provide any desired outlet water temperature and/or flow rate.

According to an exemplary embodiment, the plumbing fixture 3 is provided with a liner 31 that lines the passageway 25 and is made of thermally-conductive material, preferably a metal or alloy, especially copper or copper alloys such as brass similar to the body 5 of the mixer valve 1.

The liner 31 may be inserted into the body 23, for example via the recessed area prior to inserting the mixer valve 1 so that one end of the liner 31 seats against the body 5 of the mixer valve 1 and the outlet 11 of the mixer valve 1 seats against the other end of the liner 31 with appropriate seals such as O-rings (not shown) being provided between the adjacent faces to prevent leakage of water.

With this arrangement virtually all water contact surfaces of the mixer valve 1 and the plumbing fixture 3 are made of metal or alloy, in particular brass. The use of metals or alloys, especially brass can be beneficial in helping to control the growth of bacteria within the waterways of the mixer valve 1 and the plumbing fixture 3. Thus, bio-films form more readily on plastics than metal or alloy and bacteria are killed by contact with certain metals or alloys, especially metals or alloys containing copper such as brass.

However, the use of brass for the internal surface of the waterways may not prevent the growth of bacteria and other potentially harmful micro-organisms that may be discharged with the water flow from the plumbing fixture and present a health hazard to humans.

To further reduce and possibly eliminate the presence of bacteria and micro-organisms within the mixer valve 1 and plumbing fixture 3, it is preferred to carry out a thermal disinfection routine to kill any bacteria or micro-organisms within the waterways of the mixer valve 1 and plumbing fixture 3.

Thus, the mixer valve 1 is provided with an electrical heating element or heater 33 potted into a through bore 35 in the body 5 using thermally-conductive adhesive 37. The heater 33 may be in the form of a resistive wire heater and may be of low power, for example approximately 10 watts.

The body 23 may be made of thermally-insulating material, which advantageously may allow the thermal heating of the fluid to use less power and to provide a relatively cool outer surface for the spout.

The plumbing fixture 3 is also provided with an electrical heater 39 disposed on the outside of the liner 31. The heater 39 may be in the form of a resistive wire heater coil and may be of low power similar to the heater 33.

The electrical heaters 33 and 39 are sized and located to provide a heat source that is capable of elevating the temperature of the body 5 of the mixer valve 1 and body 23/liner 31 of the plumbing fixture 3 together with internal wetted surfaces and retained water to a temperature in excess of 60° C. for carrying out a thermal disinfection routine.

The electrical heaters 33, 39 may be controlled by the electronic controller that controls the motors 17, 19. The controller may receive feedback on the heating levels within the body 5 of the mixer valve 1 and the body 23/liner 31 of the plumbing fixture 3 via an input of the temperature from the temperature sensor 29 used to monitor outlet water temperature. According to another exemplary embodiment, a separate temperature sensor may be employed for the disinfection routine. According to another exemplary embodiment, more than one temperature sensor may be provided for monitoring and providing feedback of heating levels at different positions during the thermal disinfection cycle.

Monitoring the heating levels during the disinfection routine enables the disinfection routine to be fully managed to be safe. The temperature can be controlled to achieve and maintain an appropriate elevated temperature for a suitable period of time for effective disinfection of the waterways. Details of the temperature, time and date can be recorded and stored by the controller for recall later to check and confirm disinfection has been carried out properly.

The controller may be programmed to schedule disinfection routines at regular intervals and may initiate disinfection cycles for any time that is convenient, for example overnight when the plumbing fixture 3 may not be used. The disinfection routines may be initiated automatically. Alternatively, the controller may receive an input to initiate the disinfection routine. The input may be provided through the user interface. Alternatively, the input may be provided via a separate control to reduce the risk of inadvertent triggering of a disinfection routine.

By using electrical heaters 33, 39 to heat the body 5 of the mixer valve 1 and the body 23/liner 31 of the plumbing fixture 3, the temperature can be held at levels much higher than is normally achieved within hot water systems and so can be far more effective at eradicating micro-organisms compared to a disinfection routine that employs heating the body 5 of the valve 1 and the body 23/liner 31 of the plumbing fixture 3 with hot water.

Use of the mixer valve 1 can be disabled whilst a disinfection routine is taking place to prevent very hot water from being discharged, which might present a risk of scalding. The mixer valve 1 can be disabled for a period of time after the heating cycle has finished so as to allow the body 5 of the mixer valve 1 and the body 23 of the plumbing fixture 3 together with any water remaining in the waterways to cool down to a safe temperature for use of the mixer valve 1. This can be monitored by the temperature sensor 29 to ensure safety is maintained.

It is envisaged that power consumption can be reduced or minimized and excess heating of peripheral parts such as the control panel can be reduced or minimized by reducing the thermal mass of the part(s) to be heated and/or by insulating the outside of the valve body 5 and/or by insulating between the heater 39 and the outside surfaces of the plumbing fixture 3. FIG. 3 shows, for example, a layer of insulation 41 surrounding the heater 39.

The use of electrical heating to carry out the disinfection routine has a number of advantages over and above the current common practice of using hot water to thermally disinfect mixer valves and taps. For example, the use of electric heating elements allows the disinfection routine to be accomplished without the use of hot water, which reduces or eliminates the risk of scalding. It also eliminates the need to worry about maintaining high (above 60° C.) hot water temperatures, and also eliminates concerns over generating excessive amount of steam and water flow/water noise that may disturb room occupants, for example in hospital wards or other populated environments. Both hot and cold water supply areas may be simultaneously disinfected using the electric heating elements, so that all water-contacting areas of the components are disinfected.

Although the plumbing fitting described in the present application has been described as an electronically controlled mixer valve, according to other exemplary embodiments, it would be possible to apply the same principles to non-electronic mixer valves.

Figure 4:
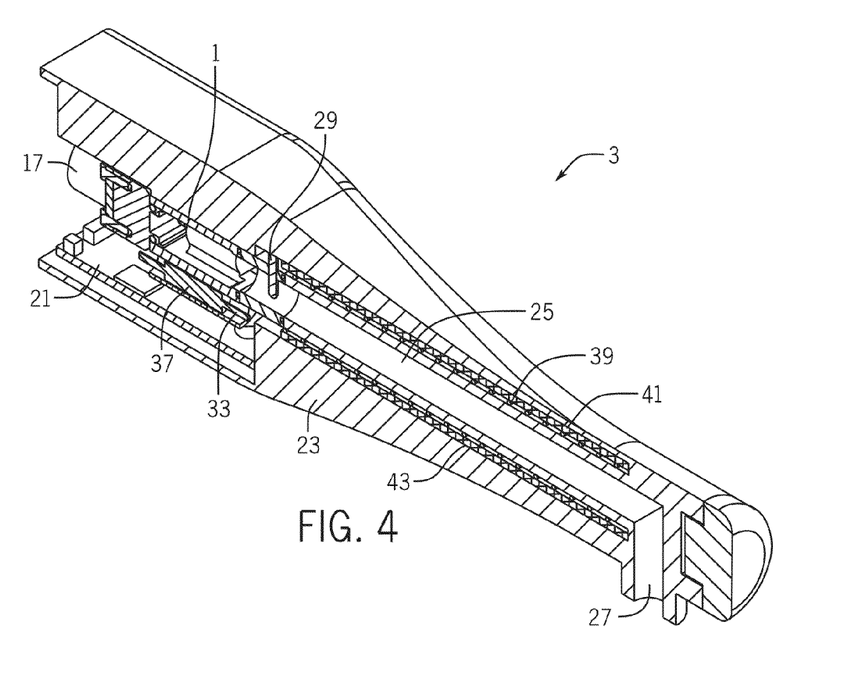
FIG. 4 is a sectional view of another plumbing fixture incorporating the mixer valve shown in FIGS. 1 and 2 according to an exemplary embodiment.

Although the plumbing fixture described herein has a liner of brass, the use of such a liner and/or material may not be essential. Thus, the liner may be omitted and the body of the plumbing fixture may be made of brass or another copper-containing material (or, as the case may be, other types of metals or thermally-conductive materials). In this form, the heating element may be built into the body similar to the heating element built into the body of the mixer valve. FIG. 4 shows the heating element 39 located in a channel 43 in the body 23 of the plumbing fixture.

Although the plumbing fixture described herein has a body made of metal or alloy, this may not be essential. Thus, the body of the plumbing fixture may be made of a material having a low thermal conductivity compared to the liner and the body of the mixer valve, for example certain plastics materials capable of withstanding the heat generated during the thermal disinfection routine.

Although the plumbing fixture described herein includes a plumbing fitting, this may not be essential. Thus, the plumbing fixture may have waterway(s) to receive water from a separate plumbing fitting with a heating device to disinfect the waterway(s).

Figure 5:
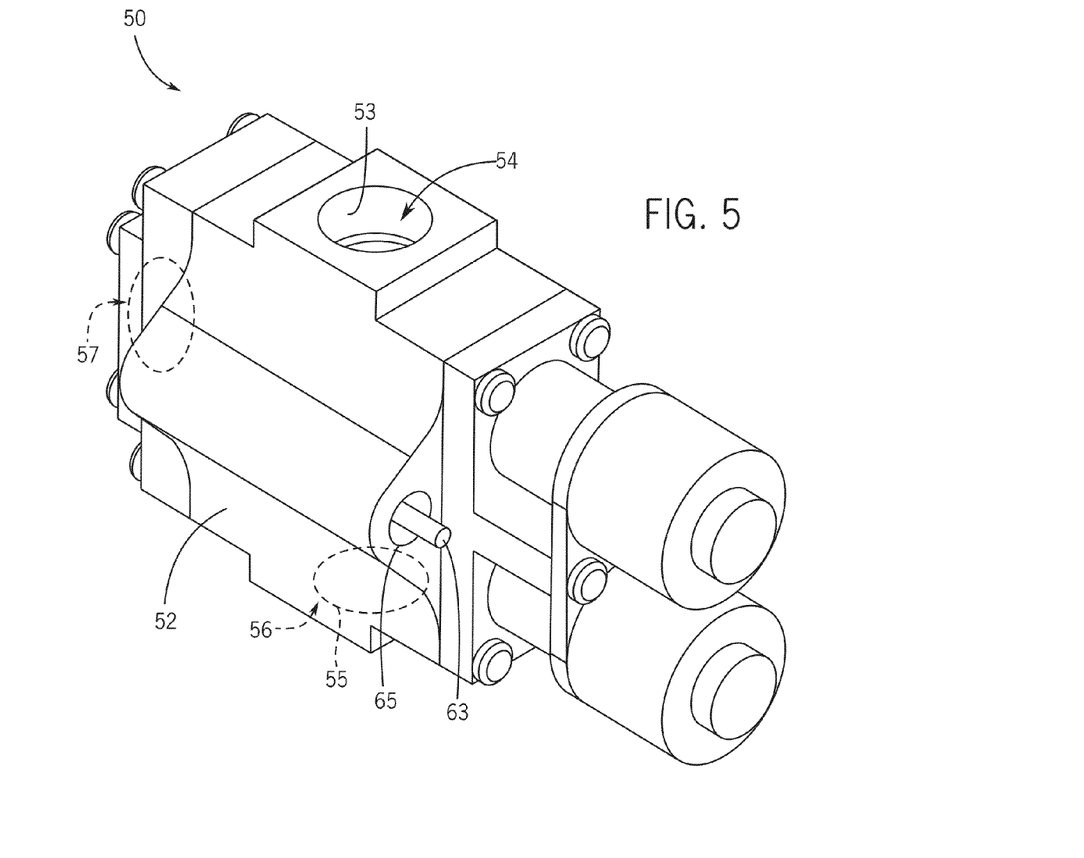
FIG. 5 is a perspective view of another exemplary embodiment of a mixer valve.

FIG. 5 is a perspective view of another exemplary embodiment of a mixer valve 50 employing a heating element such as that described herein. The mixer valve 50 is enclosed within a valve housing 52. An aperture 53 in the housing 52 forms a first fluid inlet 54 for receiving a first fluid (cold water in this embodiment). Similarly, as shown in FIG. 2, the housing 52 includes a further aperture 55 similar to the aperture 53 in the opposite side that forms a second fluid inlet 56 for receiving a second fluid (hot water in this embodiment) and a still further aperture 57 in an end thereof that forms a fluid outlet for outputting the first fluid or the second fluid or a mixture thereof. In contrast to the mixer valve 1 illustrated in FIG. 1, the inlets 54, 56 are not on the same face of the mixer valve 3 but are rather on opposed sides of the mixer valve 3.

As with the mixer valve 1 illustrated in FIG. 1, the mixer valve 50 is provided with an electrical heating element or heater 63 potted into a through bore 65 in the body 52 using a thermally-conductive adhesive (not shown, but similar to adhesive 37 illustrated in FIG. 2).

It should be understood that whether a mixer valve such as mixer valve 1 or mixer valve 50 is used may depend on various considerations such as the geometry of the component into which the mixer valve will be installed, the available space for routing fluid delivery tubes or hoses to the mixer valve, and other considerations as will be understood to those reviewing this disclosure.

It should also be noted that while mixer valves 1 and 50 are described as having an opening formed in the housing thereof through which a heating element (e.g., 33, 63) passes, other configurations may be possible according to other exemplary embodiments. For example, the heating element may be provided adjacent or in contact with an outer surface of the housing of the valve. In one example, the heating element may be provided in another component that is coupled to or in contact with an outer surface of the valve housing (e.g., a thermally-conductive component that is configured to transfer heat from the heating element to the valve body). The separate component may have a geometry that is the same as or that differs from the portion though which the heating element extends as shown in FIG. 1.

The particular location of the heating element relative to the rest of the valve body may differ as well. For example, while illustrated in FIGS. 1 and 5 as being provided adjacent the large face of the valve, a heating element may be provided adjacent one of the other sides of the valve. Additionally, while only one heating element has been shown for each of these valves, according to other exemplary embodiments, more than one heating element may be used (e.g., one on each side of the valve).

Figure 6:
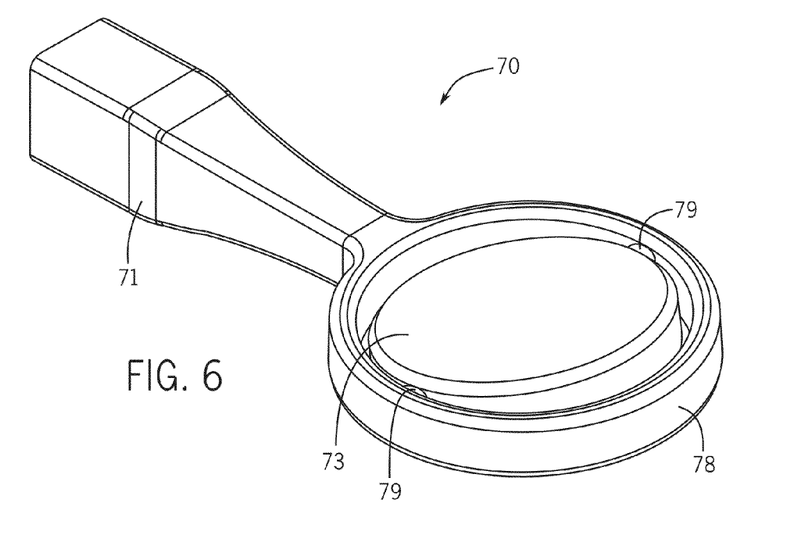
FIG. 6 is a perspective view of a showerhead according to an exemplary embodiment.
Figure 7:
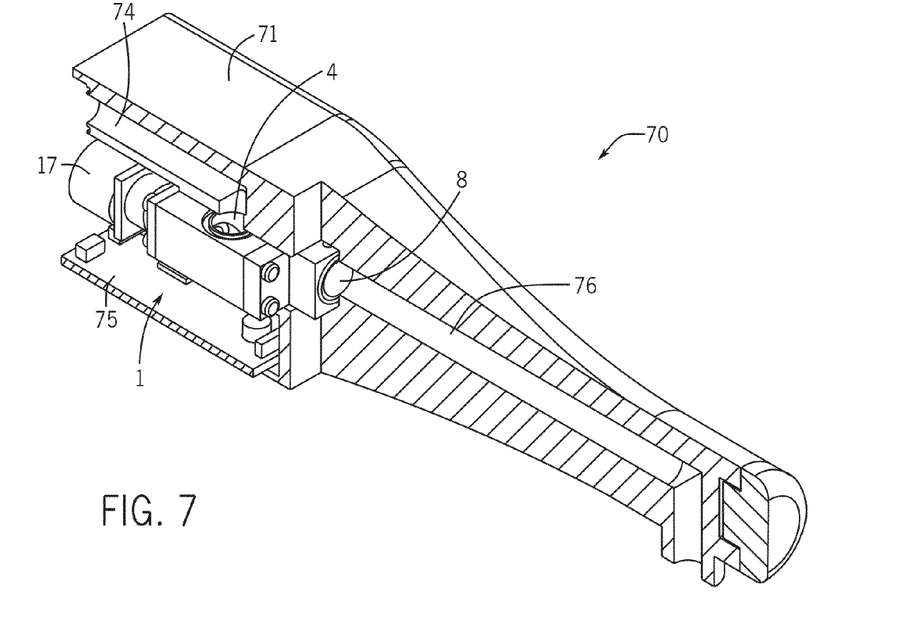
FIG. 7 is a cutaway perspective view of the showerhead shown in FIG. 6, illustrating the inclusion of a mixer valve having a heating element.

Referring to FIGS. 6 and 7, an embodiment of a plumbing fitting comprising a fluid delivery device such as a shower head 70 incorporating a mixer valve (such as mixer valve 1 shown in FIG. 1) is shown. The mixer valve 1 is similar to previous embodiments and like reference numerals are used to indicate corresponding parts.

The shower head 70 comprises a moveable handset and includes a stem 71 that can be inserted into a shower head dock within a shower enclosure (not shown). The shower head 70 could alternatively be a fixed shower head that is arranged to be fixed to and project from a wall.

The shower head 70 includes a spray head 73 that provides a plurality of outlets for discharge of water in use to provide a variety of different spray patterns. In one arrangement, the spray head 73 has outlets in opposite sides and optionally on one or more side edges. The spray head 73 can rotate within a substantially circular spray head mount 78 about diametrically opposed pivots 79 to select an outlet for use.

According to other exemplary embodiments, other types of spray heads may be used, including those that are configured to provide only a single spray pattern and those that operate differently than the spray head 73 shown in FIGS. 6 and 7 to provide multiple spray patterns.

The shower head stem 71 receives the mixer valve 1 together with the controller 75. The stem 71 includes two conduits—a cold water supply conduit 74 and a hot water supply conduit (not visible). The cold water conduit 74 connects to the first fluid inlet 4 and the hot water conduit connects to the second fluid inlet (not shown) of the mixer valve 1. The fluid outlet 8 of the mixer valve 1 is connected to the spray head 73 by an outlet conduit 76. The outlet conduit 76 extends through the spray head mount 78 and enters the spray head 73 through the pivots 79.

The controller 75 provides control signals to the mixer valve 1 for controlling the flow rate and temperature of the outlet water delivered to the spray head 73 according to the user selection via an interface (not visible). The interface may be arranged on the stem 71 to allow a user to select the flow rate and temperature of the outlet water they wish. The interface may be a physical interface including one or more rotatable knobs or linear sliders or push buttons for selecting flow rate and/or temperature. Alternatively, the interface may be a virtual interface that uses touch screen technology or the like. The interface may include a display for providing a visual indication of the flow rate and/or temperature. The display may be a digital display of numerical values and/or visual display such as an array of lights.

In other embodiments, the interface may be incorporated into a remote control that communicates with the controller 75 via a wired or wireless link. Thus, if the shower head 70 is of fixed type, then the controller 75 may receive control signals from an interface mounted remotely from the shower head 70.

Figure 8:
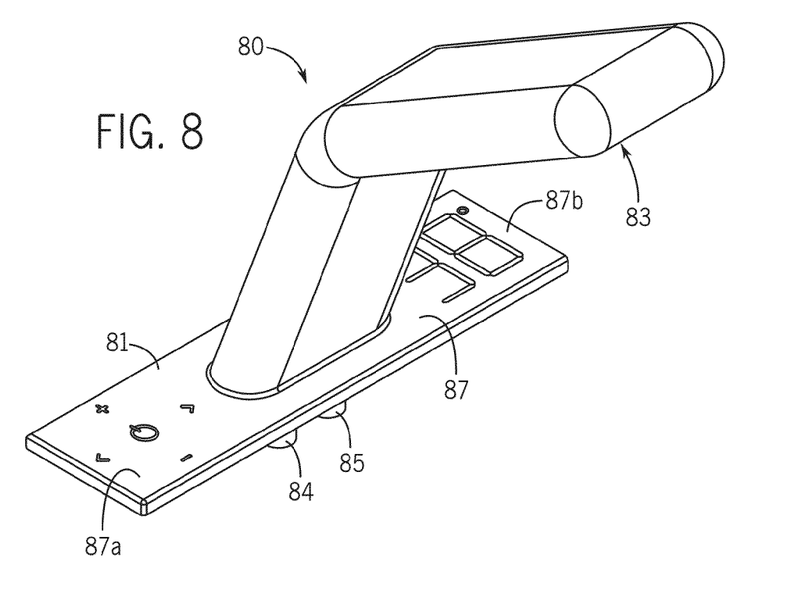
FIG. 8 is a perspective view of a faucet according to an exemplary embodiment.
Figure 9:
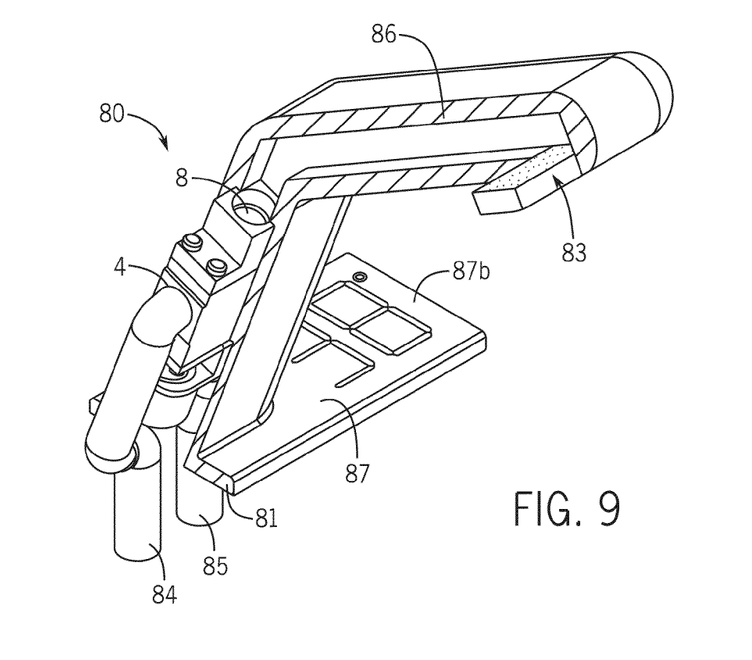
FIG. 9 is a cutaway perspective view of the faucet shown in FIG. 8, illustrating the inclusion of a mixer valve having a heating element.

Referring now to FIGS. 8 and 9, an embodiment of a plumbing fitting comprising a fluid delivery device such as a faucet 80 incorporating a mixer valve 1 having a heating element 33 is shown. The mixer valve 1 is similar to previous embodiments and like reference numerals are used to indicate corresponding parts.

The faucet 80 may be in the form of a tap and includes a base 81 by which it is secured to a support surface such as a sink or worktop (such as kitchen or bathroom worktop). The faucet 80 includes a perforated plate 83 that provides an outlet for the water for use. The faucet 80 receives the mixer valve 1 together with the controller (e.g., a controller such as the controller 75 discussed above). The faucet 80 has a stem portion (sometimes referred to as a "spout") and two conduits—a cold water supply conduit 84 and a hot water supply conduit 85. The cold water conduit 84 connects to the first fluid inlet 4 and the hot water supply connects to the second fluid inlet (not visible) of the mixer valve 1. The fluid outlet 8 of the mixer valve 1 is connected to the plate 83 by an outlet conduit 86.

The controller (not shown) provides control signals to the mixer valve 1 for controlling the flow rate and temperature of the outlet water delivered to the plate 83 according to the user selection via an interface 87 on the base 81 to allow a user to select the flow rate and temperature they wish. The interface 87 includes a touch sensitive panel 87*a* for inputting settings and a display 89*b* which shows the water temperature. It will, be appreciated that the interface 87 can be of any suitable form for receiving user inputs for controlling the mixer valve 1. It should also be understood that similar types of user interfaces may be employed either as part of or adjacent to other plumbing fixtures and fitting discussed herein (e.g., on or adjacent to a showerhead or a stem thereof, on or adjacent to a tub spout, etc.).

Conventional faucets require a valve base that is secured to the support surface and the spout then extends from the valve base to channel the water to where it needs to be dispensed. The present embodiment is advantageous as the mixer valve, due to its ability to be miniaturized (i.e. reduced in size), can be incorporated into the spout without the need for the valve base. Also the rectangular shape of the housing 2 provides the designer with the opportunity to employ different configurations for the stem portion (spout) of the faucet.

Figure 10:
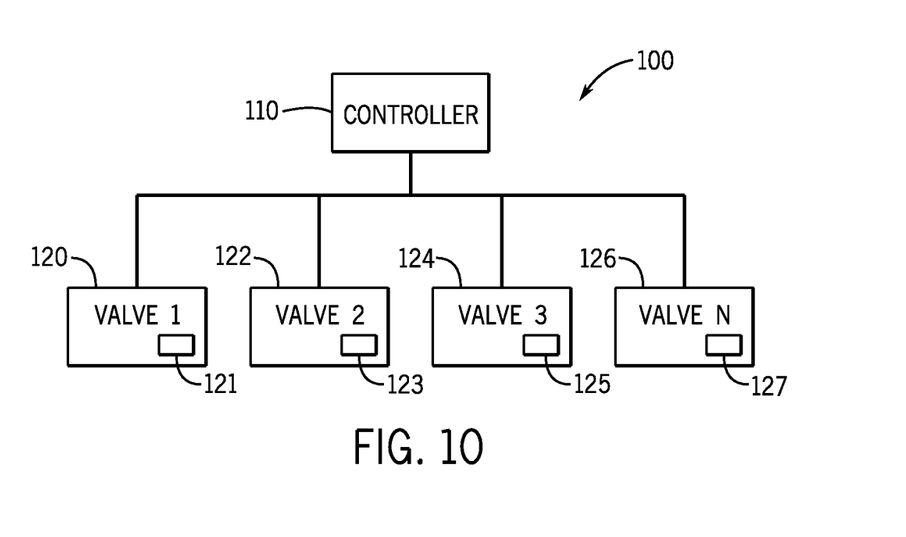
FIG. 10 is a schematic diagram of a system including a controller for controlling a plurality of valves according to an exemplary embodiment.

FIG. 10 is a schematic diagram of a system 100 that includes a controller 110 for controlling a plurality of valves 120, 122, 124, and 126. While four valves are illustrated in FIG. 10, it should be noted that any number of valves can be connected to the controller 110, which may be located in the vicinity of or remote from one or more of the valves.

The valves 120, 122, 124, and 126 may be provided as mixing valves or as flow control valves, and may each optionally include a heating element such as the heating elements described herein. The valves 120, 122, 124, and 126 may be associated with a plumbing fixture or fitting, and may be provided within the housing of the plumbing fixture or fitting (e.g., within a handle, neck, or head of a shower head, within a spout or escutcheon of a faucet, within a tub spout, etc.) or may be separate therefrom and in fluid communication therewith.

Each of the valves 120, 122, 124, and 126 may include one or more associated controllers 121, 123, 125, and 127 (e.g., similar to the electronic controllers described above, which may include, for example, a microprocessor which may be provided by a control panel 21 such as a printed circuit board (see, e.g., FIG. 3)). The controllers 120, 122, 124, and 126 may be provided in close proximity or in contact with the associated valve or may be provided in a location remote from the valve (e.g., in another portion of the plumbing fitting or fixture, in a location outside of the plumbing fitting or fixture, etc.). The one or more controllers 121, 123, 125, and 127 associated with each valve 120, 122, 124, and 126 may be configured to operate motors associated with the valves and/or may control heating elements (e.g., on/off, temperature, etc.) associated with each valve to allow a cleaning cycle to be run for the valve. In instances where a separate or common heating element is used elsewhere in an associated fixture or fitting (e.g., as with a heater coupled to thermally-conductive water-contacting components in the fixture of fitting), the controller 110 and/or the controllers 121, 123, 125, and 127, or a separate controller, may be operable to turn the heating element on or off).

The one or more controllers 121, 123, 125, and 127 associated with each of the valves 120, 122, 124, and 126 may include a clock function that may be, for instance, programmable such that the motors and/or heating elements are turned on at predetermined intervals, at predetermined times, at predetermined times after the valves were last used (e.g., 15 minutes after a user takes a shower), or at any other desired time as will be appreciated by those reviewing the present disclosure. The clock function may be incorporated into the controllers or may be provided by a separate component in communication with the valves, heating elements, and/or controllers. According to other exemplary embodiments, the timing of the motor or heating element may be controlled remotely, such as by the controller 110. According to still other exemplary embodiments, the valves, motors, heating elements, etc. may be controlled manually in place of or in addition to the clock mechanisms (e.g., the valves may be scheduled to go through a heating cycle at 2 am, at 15 minutes after a user of the valve activates the valve, and a heating cycle may also be triggered manually either at the valve location or remotely, for example, by using the controller 110).

The controller 110 may be configured to send signals to each of the controllers 121, 123, 125, and 127 121, 123, 125, and 127 to operate the valves, the motors, and/or the heating elements. As mentioned above, according to another exemplary embodiment, the controller 110 may be in direct communication with the valves, the motors, and/or the heating elements without the need for controllers associated with each of the valves. The controller 110 may communicate with the controllers (or directly with the valves, motors, and/or heating elements) via a wired or wireless communication method. For example, according to one exemplary embodiment, each of the controllers, valves, and/or motors may be in direct wired communication with a central controller 110 located remote from the various valves. In a specific example, a hospital, hotel, apartment complex, or other facility may have numerous valves throughout the building, and a central controller such as the controller 110 may be used to control the manual and/or timed actuation and/or the heating/cleaning cycles for all or for a subset of the valves. As mentioned above, the actuation of the valves may be accomplished manually and/or at scheduled times or time intervals, and may be controlled by the central controller and/or the individual controllers associated with each of the valves.

Figure 11:
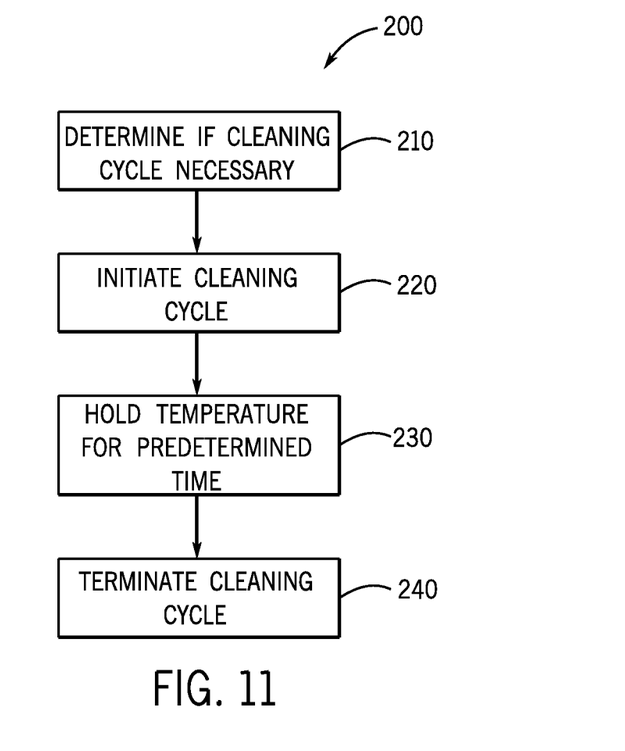
FIG. 11 is a flow diagram illustrating steps in a method for performing a cleaning routine for valves according to an exemplary embodiment.

FIG. 11 illustrates a flow diagram illustrating a method 100 for performing a heating/cleaning cycle for a valve such as the valves described herein. In a first step 110, it is determined whether a cleaning cycle is necessary. Such determination may be made, for example, as part of a predetermined schedule or program (e.g., at preset times, at preset timing intervals, at some preset time after the valve is used, etc.), and may be determined either at controllers associated with each valve or may be determined at a central controller associated with a plurality of valves.

After it is determined that a heating/cleaning cycle is necessary, the heating/cleaning cycle is initiated in a step 220. The heating/cleaning cycle may involve, for example in a step 230, heating the heating element associated with the valve (and/or the fixture or fitting with which the valve is associated) to a desired temperature and holding it at that temperature for a desired amount of time or cycling the temperature between more than one temperature, ideally at temperatures/times sufficient to disinfect the water-contacting parts of the valve (and/or the fixture or fitting), such as to kill microorganisms that may be present.

In addition to the heating component of the heating/cleaning cycle, the valves may optionally be operated to allow water to flow through the passageways of the valve and the associated fittings/fixtures so as to allow purging of materials or organisms that may be present. This actuation of the valves to allow water flow may also be directed by the controllers associated with the valve or by a remote controller in communication with the valve or associated controller, motor(s), etc.

Once the heating/cleaning cycle is completed, the cycle is terminated in a step 240. The termination may occur after a predetermined time, after a predetermined time at which the heating element and/or valve are at a desired temperature, or any other point at which it is desired to stop the heating/cleaning cycle.

It is also possible to manually perform a heating/cleaning cycle, either by initiating the heating/cleaning remotely (as from the controller 110) or by directly inputting a desired command at the location of the valve. For example, where the faucet includes a switch or user interface configured to allow the initiation of a cleaning cycle, a cycle at a predetermined time/temperature may be performed upon such initiation.

The control functions of the various controllers described herein can be implemented in digital electronic circuitry, or in computer software, firmware, or hardware, including the structures disclosed in this specification and their structural equivalents, or in combinations of one or more of them. The controls can be implemented as one or more computer programs, i.e., one or more modules of computer program instructions, encoded on one or more computer storage medium for execution by, or to control the operation of, data processing apparatus, such as a processing circuit. A processing circuit such as a CPU, for example, may comprise any digital and/or analog circuit components configured to perform the functions described herein, such as a microprocessor, microcontroller, application-specific integrated circuit, programmable logic, etc. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The controls described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. External controllers discussed herein (such as controller 110) may be part of a larger building management system (BMS) that may control various features within a building, which may advantageously provide centralized control not only, for example, for the disinfecting routines, but also for other features such as lighting, air conditioning, and the like.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of the controls described herein may include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the control programs can be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the control program described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

As utilized herein, the terms "approximately," "about," "around," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the mixer valves and related assemblies as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Features of any of the embodiments may be employed separately or in combination with any other feature(s) of the same or different embodiments and the disclosure extends to and includes all such arrangements whether or not described herein.

Other substitutions, modifications, changes and omissions may also be made in the design, operating conditions and arrangement of the various exemplary embodiments without departing from the scope of the inventions described herein. Other modifications that can be made will be apparent to those skilled in the art and the invention extends to and includes all such modifications. Any of the features described herein may be employed separately or in combination with any other feature and the invention extends to and includes any such feature or combination of features.

What is claimed is:

1. A plumbing component comprising:
    a mixer valve provided within a portion of the plumbing component and configured to control the flow of water through the plumbing component, the mixer valve comprising a body and at least one waterway within the body;
    a first electric heater extending through at least a portion of the body of the mixer valve and configured to heat at least a portion of the body to an elevated temperature sufficient to kill organisms within the waterway;
    a waterway provided within the plumbing component and downstream of an outlet of the mixer valve; and
    a second electric heater for heating a surface of the waterway, which leads to an outlet of the plumbing component, to an elevated temperature sufficient to kill organisms within the waterway of the plumbing component;
    wherein the portion of the body is a wall that defines at least a portion of a mixing chamber of the mixer valve.

2. The plumbing component of claim 1, wherein the plumbing component is a faucet.

3. The plumbing component of claim 2, wherein the mixer valve and the first electric heater are provided within a spout of the faucet.

4. The plumbing component of claim 1, wherein the plumbing component is a shower head.

5. The plumbing component of claim 4, wherein the mixer valve and the first electric heater are provided within a handle or a neck of the shower head.

6. The plumbing component of claim 1, wherein the plumbing component is a plumbing fitting.

7. The plumbing component of claim 1, further comprising a liner within the plumbing component that defines the waterway, the liner being formed from a thermally conductive material, the second electric heater being disposed between the liner and a body of the plumbing component, and the second electric heater being configured to heat the liner.

8. The plumbing component of claim 1, wherein the body includes an opening and the first electric heater extends at least partially through the opening.

9. The plumbing component of claim 1, wherein the first electric heater is a resistive wire heater.

10. The plumbing component of claim 1, wherein the mixer valve is for a shower head.

11. The plumbing component of claim 1, wherein the mixer valve is for a faucet.

12. The plumbing component of claim 1, wherein the mixer valve includes at least one stepper motor associated therewith for opening and closing the mixer valve, wherein the at least one stepper motor is provided within a body of the plumbing component.

13. The plumbing component of claim 1, further comprising a controller within the plumbing component for controlling at least one of operation of the mixer valve or activation of at least one of the first and second electric heaters.

14. The plumbing component of claim 1, further comprising a user interface associated with the plumbing component for controlling the temperature of water exiting the plumbing component.

15. A water delivery component configured to be engaged by a user for providing water as directed by the user, the water delivery component comprising:
    a mixer valve provided within a portion of the water delivery component, the mixer valve comprising a first inlet for receiving cold water and a second inlet for receiving hot water, wherein the mixer valve is configured to mix the hot water and cold water in a mixing chamber provided within the mixer valve;
    a first heating element extending through at least a portion of the mixer valve and configured to heat at least a portion of the mixer valve to an elevated temperature sufficient to kill organisms that may be within the mixer valve;
    a waterway within the water delivery component; and
    a second heating element for heating a surface of the waterway to an elevated temperature sufficient to kill organisms within the waterway of the water delivery component, wherein the second heating element is separate from the first heating element extending through at least a portion of the mixer valve.

16. The water delivery component of claim 15, wherein the water delivery component is selected from the group consisting of a faucet, a shower head, and a plumbing fitting.

17. The water delivery component of claim 16, wherein the water delivery component is a faucet and the mixer valve and the first heating element are provided within a spout of the faucet.

18. The water delivery component of claim 16, wherein the water delivery component is a shower head and the mixer valve and the first heating element are provided within a handle or neck of the shower head.

19. The water delivery component of claim 16, wherein the water delivery component is a plumbing fitting.

20. The water delivery component of claim 15, further comprising a liner within the water delivery component that defines the waterway, the liner being formed from a thermally conductive material, the second heating element configured to heat the liner.

21. The water delivery component of claim 15, wherein at least one of the first or second heating elements is a resistive wire heater.

22. The water delivery component of claim 15, wherein the mixer valve includes a plurality of stepper motors provided within the portion of the water delivery component.

23. The water delivery component of claim 15, further comprising a controller within the water delivery component for controlling activation of at least one of the first and second heating elements.

24. The water delivery component of claim 15, further comprising an integral user interface associated with the water delivery component for controlling the temperature of water exiting the water delivery component.

25. A plumbing fixture comprising:
a mixing valve including a body, a first inlet configured to be coupled to a first fluid source and a second inlet configured to be coupled to a second fluid source, and an outlet for directing a mixture of the first and second fluids out of the mixing valve;
a first electric heating element provided within the plumbing fixture for heating the body of the mixing valve to an elevated temperature sufficient to kill organisms within the mixing valve;
a waterway within the plumbing fixture; and
a second electric heating element for heating a surface of the waterway to an elevated temperature sufficient to kill organisms within the waterway of the plumbing fixture.

26. The plumbing fixture of claim 25, wherein the plumbing fixture is a faucet and the mixing valve and the first electric heating element are provided within a spout of the faucet.

27. The plumbing fixture of claim 25, wherein the plumbing fixture is a shower head and the mixing valve and the first electric heating element are provided within a handle or neck of the shower head.

28. The plumbing fixture of claim 25, further comprising a liner within the plumbing fixture that defines the waterway, the liner being formed from a thermally conductive material, the second electric heating element configured to heat the liner.

29. The plumbing fixture of claim 25, wherein at least one of the first or second electric heating elements is a resistive wire heater that extends through a portion of the body.

30. The plumbing fixture of claim 25, wherein the mixing valve includes a plurality of stepper motors provided within the portion of the plumbing fixture.

31. The plumbing fixture of claim 25, further comprising a controller within the plumbing fixture for controlling activation of at least one of the first or second electric heating elements.

32. The plumbing fixture of claim 25, further comprising an integral user interface associated with the plumbing fixture for controlling the temperature of water exiting the plumbing fixture.

* * * * *